(12) United States Patent
Korus et al.

(10) Patent No.: US 9,088,874 B2
(45) Date of Patent: Jul. 21, 2015

(54) METHOD AND SYSTEM OF PROVIDING SERVICE TO A MOBILE DEVICE IN A COMMUNICATION NETWORK

(75) Inventors: Michael F. Korus, Eden Prairie, MN (US); Michelle M. Antonelli, Barrington, IL (US); Peter M. Drozt, Prairie Grove, IL (US); Donald G. Newberg, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 713 days.

(21) Appl. No.: 12/966,134

(22) Filed: Dec. 13, 2010

(65) Prior Publication Data
US 2012/0149421 A1    Jun. 14, 2012

(51) Int. Cl.
*H04B 7/00* (2006.01)
*H04W 4/10* (2009.01)
*H04W 76/00* (2009.01)
*H04W 60/00* (2009.01)

(52) U.S. Cl.
CPC .............. *H04W 4/10* (2013.01); *H04W 76/005* (2013.01); *H04W 60/005* (2013.01)

(58) Field of Classification Search
CPC ..... H04W 88/06; H04W 48/18; H04W 92/02; H04W 4/12; H04W 16/14; H04W 4/18; H04W 76/026; H04W 88/00; H04W 76/025; H04W 76/005; H04L 12/5692; H04L 65/1073; H04L 29/06224; H04L 65/4061; H04M 2207/20; H04M 3/4217; H04Q 2213/13
USPC ............ 455/518, 519, 552.1, 445, 433, 90.2, 455/450, 560, 414.3, 428, 507, 432.1, 455/412.1, 422.1, 426, 435.1, 435.2; 370/335, 342, 441, 401, 352, 355, 466
See application file for complete search history.

(56) References Cited

U.S. PATENT DOCUMENTS 6,697,620 B1 *  2/2004  Lamb et al. ................ 455/432.1
7,006,491 B2 *  2/2006  Saeed et al. .................... 370/352
(Continued)

FOREIGN PATENT DOCUMENTS

EP            1463368 A2     9/2004
WO      2009143195 A2    11/2009

OTHER PUBLICATIONS

TIA Standard; Project 25; Inter-RF Subsystem Interface Messages and Procedures for Voice and Mobility Management Services; TIA-102.BAGA-A; Jan. 2009; 382 Pages.
(Continued)

*Primary Examiner* — Sujatha Sharma
(74) *Attorney, Agent, or Firm* — Valerie M. Davis; Kenneth A. Haas

(57) ABSTRACT

A mobile device registers with an infrastructure device coupled to a first communication network and then sends a request to activate PTT service in the first communication network. A communication server is adapted to receive the request to activate the PTT service, and to, thereby, activate the PTT service for the mobile device in the first communication network. Responsive to receiving the request to activate the PTT service, the communication server makes a determination to register the mobile device with a second communication network, generates a service registration message, on behalf of the mobile device, to register the mobile device with the second communication network, and sends the service registration message to the second communication network.

19 Claims, 4 Drawing Sheets

(56) References Cited

U.S. PATENT DOCUMENTS

| | | | |
|---|---|---|---|
| 8,316,117 B2* | 11/2012 | Nguyen et al. | 709/222 |
| 8,327,024 B2* | 12/2012 | Pattison et al. | 709/246 |
| 8,401,159 B2* | 3/2013 | Tal et al. | 379/93.01 |
| 2006/0052126 A1 | 3/2006 | Choksi | |
| 2006/0072517 A1 | 4/2006 | Barrow et al. | |
| 2007/0002832 A1* | 1/2007 | Sylvain | 370/352 |
| 2010/0232417 A1* | 9/2010 | Segre | 370/352 |
| 2011/0107379 A1* | 5/2011 | Lajoie et al. | 725/87 |
| 2011/0151917 A1* | 6/2011 | Mao et al. | 455/519 |
| 2012/0045040 A1* | 2/2012 | Maes | 379/67.1 |

OTHER PUBLICATIONS

International Search Report and Written Opinion for international Application No. PCT/US2011/064467 mailed on Mar. 21, 2012.

Rosenberg, J., et al., "SIP : Session Initiation Protocol," Network Working Group, RFC 3261, Jun. 2002.

Schulzrinne, H., et al., "RTP: A Transport Protocol for Real-Time Applications," Network Working Group RFC 3550, Jul. 2003.

* cited by examiner

```
                    XML SOURCE EXAMPLE

<?xml version="1.0" encoding="UTF-8"?>
<poc-settings xmlns="urn:oma:params:xml:ns:poc:poc-settings">
<mot_poc-settings xmlns="urn:oma:params:xml:ns:poc:poc-settings">
        <entity id="do39s8zksn2d98x">
                <isb-settings>
                        <incoming-session-barring active="true"/>
                </isb-settings>
                <am-settings>
                        <answer-mode>automatic</answer-mode>
                </am-settings>
                <ipab-settings>
                        <incoming-personal-alert-barring active="false"/>
                </ipab-settings>
                <sss-settings>
                        <simultaneous-sessions-support active="true"/>
                </sss-settings>
                <p25id-settings>
                        <p25-identifier>
                                <P25_wacn="55555">
                                <p25_sys_id=333">
                                <p25_unit_id=666666">
                        </p25-identifier>
                        <p25-identifier>
                                <P25_wacn="55555">
                                <p25_sys_id=333">
                                <p25_unit_id=666666">
                        </p25-identifier>
                </p25id-settings>
        </entity>
</poc-settings>
```

400

402 { (bracketing the p25id-settings block)

*FIG. 4*

METHOD AND SYSTEM OF PROVIDING SERVICE TO A MOBILE DEVICE IN A COMMUNICATION NETWORK

TECHNICAL FIELD

The present disclosure relates generally to communication systems and in particular to a system and method of providing service to a mobile device in a communication network.

BACKGROUND

Efficient, reliable, and real-time communication with minimal latency is a critical requirement for public safety organizations and first responders. Toward that end, the Telecommunications Industry Association (TIA) adopted and standardized a suite of Land Mobile Radio (LMR) standards termed Project 25 (P25), as described for example, in the TIA 102-series documents. The P25 standard defines the operation and interfaces of P25-compliant narrowband radio systems. Additionally, through a gateway, non-P25 compliant radio systems, such as broadband cellular networks, can also interoperate with P25 networks. As used herein, the terms "P25" and "APCO 25" are used interchangeably.

As one example, portable radio transceivers or "walkie-talkies" are often operated within a narrowband P25 network to quickly establish one-to-one and one-to-many communication links. Such radio transceivers are indispensable for law enforcement, rescue, and military personnel, and have even become commonplace across various business environments as well as for recreational activities. In particular, radio transceivers can provide a near instantaneous connection between users in a talkgroup by utilizing push-to-talk (PTT) communications over a half-duplex radio transmission system.

Advances in cellular packet-switched networks have resulted in the development of a broadband push-to-talk over cellular (PoC) service, for example, as described in PoC V1.0.3 Enabler Package released September 2009 by Open Mobile Alliance (OMA), which is hereinafter referred to as OMA PoC. Specifically, an OMA PoC network provides a half-duplex Voice Over Internet Protocol (VoIP) solution, with well-known PTT functionality. OMA PoC is implemented using a Session Initiation Protocol/Internet Protocol (SIP/IP) core. More particularly, OMA PoC employs infrastructure components (also referred to herein as the SIP/IP core) that operate using familiar protocols for voice and control signaling, including Real-Time Transport Protocol (RTP), as described, for example, in Request for Comments (RFC) 3550 dated July 2003 by Internet Engineering Task Force (IETF) and any subsequent revisions, and SIP, for example, as described in RFC 3261 published June 2002 by IETF Network Working Group and any subsequent revisions.

Moreover, broadband cellular networks have continued to improve, for example, with the introduction of 3GPP Long Term Evolution (LTE), as described in the 3GPP 36-series documents and any subsequent revisions. Specifically, LTE networks are designed to offer low latency and high throughput, enabling reliable IP-based streaming of video and other multimedia services. As broadband cellular networks experience greater deployment, it is often desirable for such broadband networks to reliably interface with legacy narrowband networks.

In one example, public safety organizations and first responders use narrowband systems for voice communication while utilizing a complementary broadband cellular network to enable data-intensive multimedia communication. Thus, it may be desirable to extend voice communication, such as PTT communication, from the narrowband network to the broadband network. In another example, enhancement of a broadband PTT service is facilitated by extending the broadband PTT services to include the PTT functionality provided by the narrowband system. However, the extension of such features between two different (and in some cases disparate, i.e., dissimilar and distinct in kind) communication networks should be accomplished in such a way so as to maintain a reliable link between the disparate networks while also maintaining the latency and throughput benefits afforded by the broadband network.

Accordingly, there is a need for a system and method of providing service to a mobile device in a communication network.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 4 illustrates an extensible markup language (XML) computer-readable code in accordance with some embodiments.

Figure 1:
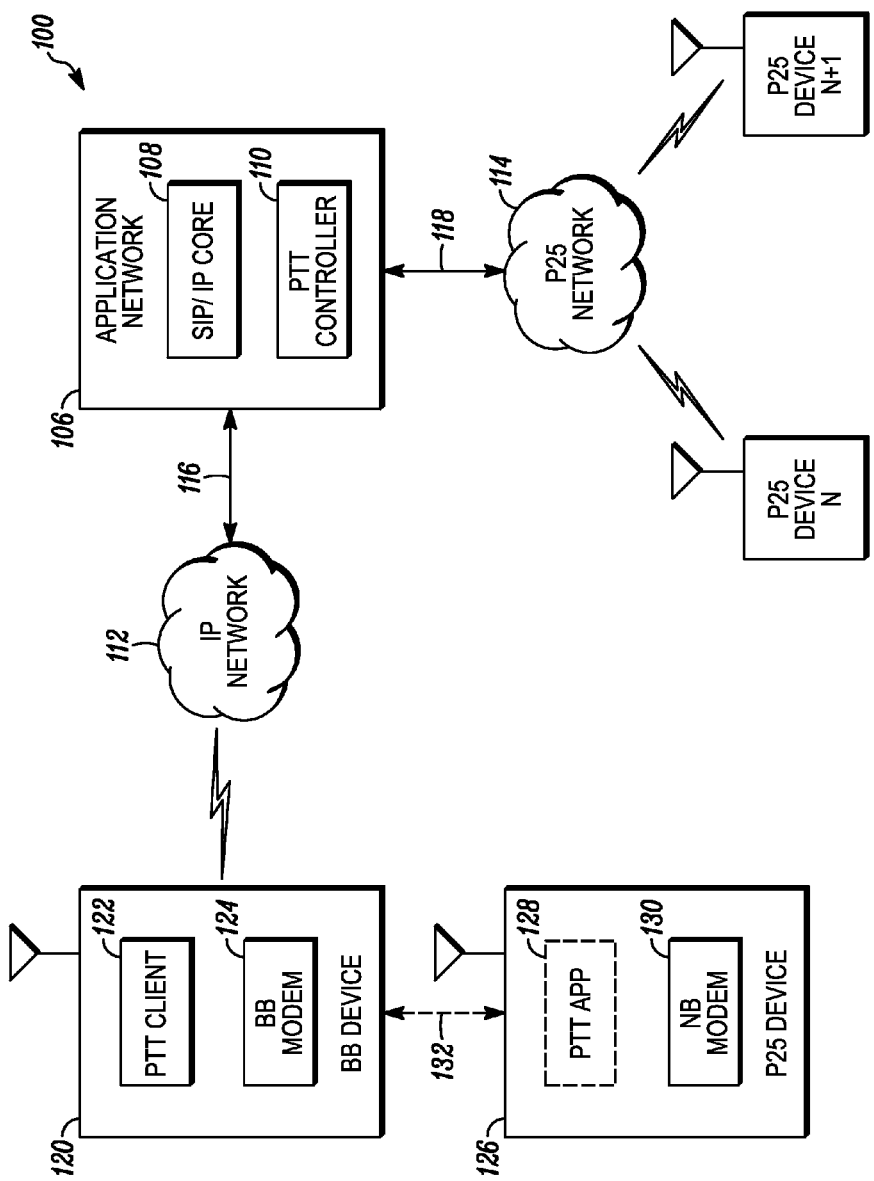
FIG. 1 illustrates a communication system in accordance with illustrative embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method of providing service to a mobile device in a communication network, such as in a push-to-talk (PTT) communication network. A mobile device registers with an infrastructure device in a first communication network and then sends a request to activate PTT service in the first communication network. A communication server is adapted to receive the request to activate the PTT service, and to, thereby, activate the PTT service for the mobile device in the first communication network. Responsive to receiving the request to activate the PTT service, the communication server makes a determination to register the mobile device with a second communication network, generates a service registration message, on behalf of the mobile device, to register the mobile device with the second communication network, and sends the service registration message to the second communication network.

Referring now to the figures, FIG. 1 shows a communication system 100 capable of supporting PTT services for mobile devices registered and operating within system 100. The communication system 100 provides a general depiction of a physical implementation of various aspects of the present disclosure. Communication system 100 includes an application network 106 that is coupled via a wired or wireless link 116 to a first communication network 112 and via a wired or wireless link 118 to a second communication network 114. Communication system 100 further includes mobile devices 120, 126, N, and N+1. As illustratively described herein, networks 112 and 114 are, respectively, a broadband (wideband) network and a narrowband network. Thus, in this illustrative implementation, networks 112 and 114 are not only different communication networks, they are disparate communication networks (meaning that the two networks are different in type and kind). However, in other embodiments, network 114 may also be a broadband network, such that networks 112 and 114 are not disparate.

As used herein, the term broadband network is defined as a network where the bandwidth of messages sent in the network can significantly exceeds the channel's coherence bandwidth, and the network has channels having a broad enough range of frequencies such that it can be used for many different types of traffic, e.g., data, video, and audio. By contrast, the term narrowband network is defined as a network where the bandwidth of the messages sent in the network does not significantly exceeds the channel's coherence bandwidth; the channels within the network are sufficiently narrow that their frequency response can be considered flat; and the network is typically used for only one type of traffic, such as audio.

Moreover, in this illustrative embodiment, the system elements are described as being compliant with IP, SIP, P25, and OMA PoC protocols, over-the-air interfaces, and standards. However, the implementation of the present teachings does not depend on the use of these protocols, over-the-air interfaces, and standards but can be applied to various other protocols, over-the-air interfaces, and standards as determined by the particular implementation of the communication networks 112, 114 (and corresponding radio access technology), and on the particular application network 106 implementation. In addition, only a limited number of mobile devices and communication networks and one application network are shown for simplicity of illustration. However, it should be understood that the present teachings extend to a system that includes additional such elements.

In general, the application network components and the mobile devices 120, 126, N, and N+1 in system 100 are implemented using one or more memory devices, network interfaces, and processing devices that are operatively coupled, and which when programmed form the means for these system elements to implement their desired functionality, for example, as illustrated by reference to the method, sequence diagram, and accompanying message structure shown in FIGS. 2-4.

The network interfaces are used for signaling or messaging (e.g., packets, datagrams, frames, superframes, or any other information blocks) between the application network 106 and the devices 120, 126, N, and N+1 of the system 100. The implementation of the network interfaces depends on whether the connection between the elements is wired or wireless. For example, the interfaces between two elements within system 100 can include one or more wired interfaces such as a serial port interface (e.g., compliant with the RS-232 standard), a parallel port interface, an Ethernet interface, a USB interface, and/or a FireWire interface, and the like. Where the interfaces support wireless communications, the interfaces comprise elements including processing, modulating, and transceiver elements (e.g., modems) and modems that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of system 100 may be programmed with software or firmware logic or code for performing functionality described by reference to FIGS. 2-4; and/or the processing device may be implemented in hardware, for example, as a state machine or ASIC (application specific integrated circuit). The memory implemented by these system elements can include short-term and/or long-term storage of information needed for the functioning of the respective elements. The memory may further store software or firmware for programming the processing device with the logic or code needed to perform its functionality.

We now turn to a brief description of general functionality performed by the system elements shown in FIG. 1, which will aid in the understanding of the later description of the methods and message structures illustrated in FIGS. 2-4. The broadband network 112 can be any broadband network and in this illustrative implementation is an IP-based network, wherein the infrastructure elements within the network (not shown, e.g., IP routers, asynchronous transfer mode (ATM) switches, Multi-Protocol Label Switching (MPLS) switches, home agents, foreign agents, etc.) are IP compliant, for example based on RFC 791 (i.e. IPv4) or RFC 2460, and any subsequent versions. For example, in one illustrative implementation, IP network 112 is a 3GPP Long Term Evolution (LTE)-compliant network containing an LTE core and Radio Access Network. In other implementations, the IP network 112 comprises a Worldwide Interoperability for IEEE 802.16 Microwave Access (WiMAX) core and RAN, a 3GPP2 EV-DO core and RAN, IEEE 802.11 based WiFi, digital subscriber line (DSL), an integrated service digital network (ISDN), a T-1 line, a satellite connection, to name a few.

The communication network 114 can be any narrowband network (or broadband network for that matter), but in the illustrated implementation is a P25 network that includes infrastructure elements, e.g., base stations, base station controllers, and the like that are P25-compliant. Thus, the network 114 operates using a narrowband protocol such as the Common Air Interface (CAI) protocol or other narrowband protocols of a type well-known in the industry.

The application network 106 performs application layer (i.e., layer seven of the Open Systems Interconnection (OSI) model) functions that facilitate the provision of services (such as PTT services) for mobile devices using the broadband IP network 112. Moreover, in accordance with the teachings herein, the application network 106 performs functionality that facilitates enhancement of the broadband PTT service of network 112 by extending those broadband PTT services to include PTT functionality in a second communication network, in this case the narrowband P25 network 114.

In the present illustrative implementation, the application network 106 is an OMA PoC network that facilitates one or more OMA PoC Sessions, which are SIP Sessions established by the procedures of the OMA PoC specification, for media transfer over the broadband IP network 112. Accordingly, the application network 106 includes a SIP/IP core 108 and an OMA PoC server 110, wherein the OMA PoC server functions as a PTT controller, and is thus, hereinafter, referred to as the PTT controller 110.

The SIP/IP core 108 includes a number of RFC 3261 compliant SIP proxies and SIP registrars that perform registration services for mobile devices prior to the mobile devices activating the PTT services in the broadband IP network 112. For example, the mobile device registers (with the SIP/IP core) a PTT identifier for receiving PTT services in the broadband IP network. The SIP/IP core also, among other functions, routes SIP signaling between the PTT controller and a PTT client, such as an OMA PoC client, residing on the mobile devices.

The PTT controller 110, among other functions, provides for: OMA PoC Session handling, which includes media distribution, talk burst control, media burst control, policy enforcement, and participant information; SIP Session handling, such as SIP Session origination, release, etc., on behalf of one or more OMA PoC clients; and OMA PoC service settings storage, wherein a service setting is defined as a set of parameters indicating the capability of a PTT client and the willingness of a PTT user to support related PTT Client and PTT controller functionalities and includes by way of example, but is not limited to auto/manual call answer, call barring, alert barring, and simultaneous session support, among other. The PTT controller 110 further interoperates with the P25 network for transferring signaling and media to extend the broadband PTT services to include the PTT functionality provided by the P25 network so that mobile devices operating in the broadband IP network 112 can communicate with mobile devices operating in the P25 network 114. Such interoperability functions may include, for instance, a translation between P25 standards and broadband standards such as OMA PoC.

The mobile devices in system 100 include a broadband device 120 having a PTT client 122 and a broadband (BB) modem 124 that wirelessly couples the broadband device 120 to the broadband IP network 112, and a narrowband P25-compliant device 126 (also interchangeably referred to herein simply as a P25 device) having a PTT application (APP) 128 and a narrowband (NB) modem 130 adapted to wirelessly couple the P25 device 126 to the P25 network 114. The mobile devices in system 100 further include two other P25 devices N and N+1, which each include at least a narrowband PTT application and a narrowband modem (not shown) that wirelessly couples the respective P25 device to the P25 network 114. Moreover, the P25 device 126 is communicatively coupled to the broadband device 120, as indicated by an arrow 132. In some embodiments, the P25 device 126 is tethered to the broadband device 120 by a BLUETOOTH connection or other well-known wired or wireless connection.

The PTT client 122 residing on the broadband device 120, in this illustrative implementation, is an OMA PoC client, which is a functional component or entity that communicates with the OMA PoC server (namely the PTT controller 110) to support OMA PoC PTT services in compliance with the OMA PoC specification. However, the PTT client can include any suitable PTT application that supports PTT services on one or more communication networks. The PTT application 128 residing in the P25 device in one implementation includes only a narrowband (e.g., P25-compliant) PTT application, and in another implementation includes both the P25-compliant PTT application and a broadband PTT application (such as an OMA PoC client).

The mobile devices in system 100 are also commonly referred to in the art as communication devices, subscribers, user equipment, access devices, access terminals, mobile stations, mobile subscriber units, subscriber units, user devices, and the like. These mobile devices can be any type of communication device such as radios, mobile phones, mobile data terminals, Personal Digital Assistants (PDAs), laptops, two-way radios, cell phones, etc.

Figure 2:
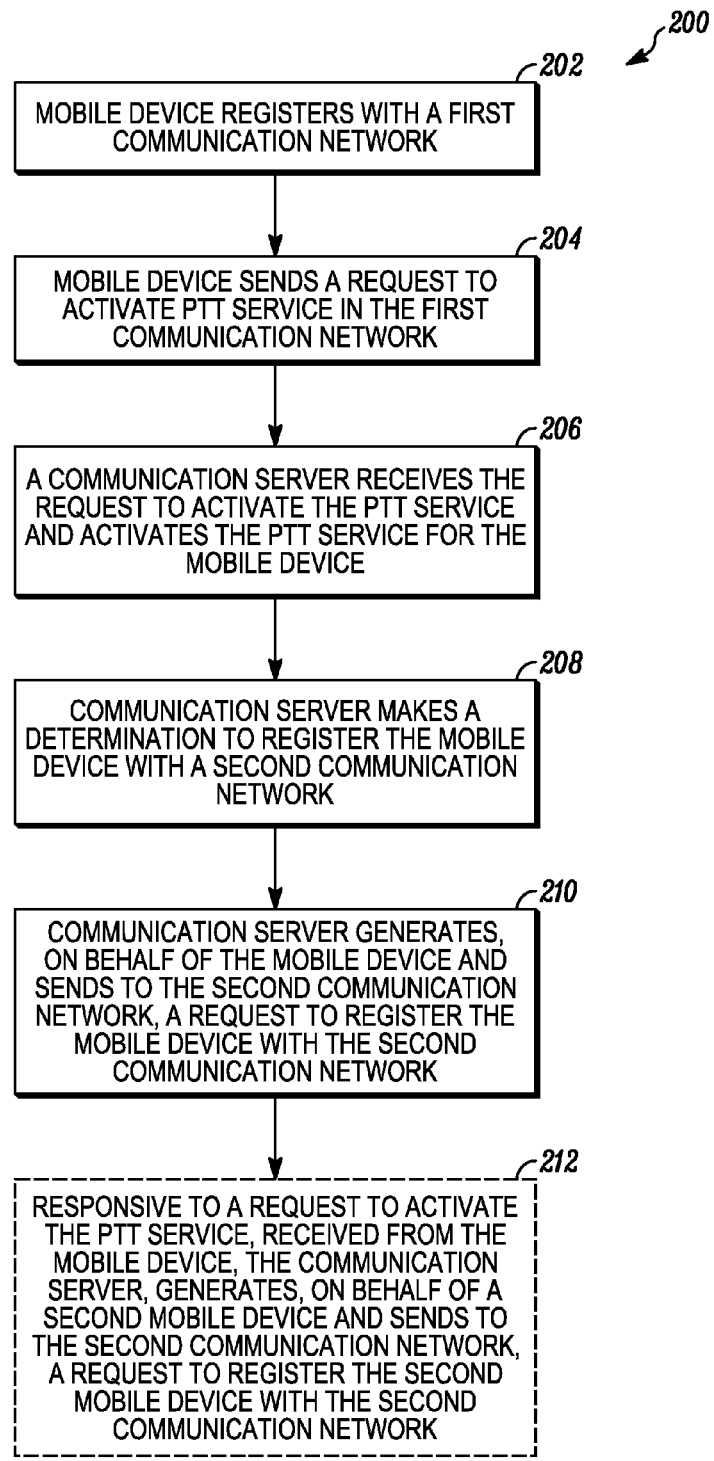
FIG. 2 is a logical flowchart showing an illustrative method for providing service to a mobile device in a communication network in accordance with some embodiments.

Turning now to the operation of the various elements of system 100 in accordance with the present disclosure, FIG. 2 shows a flow diagram illustrating a general method 200 for providing a service, namely a PTT service, in accordance with embodiments of the present disclosure. The functionality of method 200 is performed by a mobile device (for example the broadband device 120) and the application network 106. Such functionality (as well as the functionality illustrated by way of the remaining FIGS. 3 and 4) is performed using the combination of a processing device, memory, and interface coupled together and adapted (through software, firmware, or hardware programming, for instance) to perform such functionality.

More particularly, at 202, the broadband device 120 registers with an infrastructure device communicatively coupled (via a wireless or wired connection) to a first communication network (e.g., the broadband IP network 112). Any suitable registration process is used such as, for instance, a registration process compliant with SIP as set forth in RFC 3261, wherein the broadband mobile device 120 registers with a SIP server like a server included in the SIP/IP core 108. Upon successful registration with the infrastructure device, the broadband device 120 sends (204) a request to activate PTT service in the first communication network, wherein the request is sent to a communication server such as an OMA PoC Server. The request to activate the PTT service can be implemented using any suitable standard or proprietary message, such as a message carrying a service setting or a registration message, wherein the service setting or the registration procedure serves as the implicit or explicit request to activate the PTT service. Thus, the request to activate the PTT server can be an explicit request via messaging from the broadband device 120; or in another implementation can be an implicit request, which does not require an explicit massage from the broadband device that is directed to the OMA PoC Server. For example, the request to activate the PTT service can be implied from a registration message that the broadband device 120 sends to register with the SIP/IP core 108.

The communication server receives (206) the request to activate the PTT service, and, accordingly, activates the PTT service for the broadband mobile device to enable the broadband device 120 to begin sending and receiving media via the first communication network using the PTT service of that communication network. Also, in accordance with the present teachings, the communication server makes a determination (208) upon receiving the request to activate the PTT service to also register the broadband device 120 with a different (second) communication network (e.g., another broadband network or a disparate communication network such as a narrowband communication network like the P25 network 114).

The communication server determines whether to register the broadband device 120 with the second communication network based upon the request to activate the PTT service and more particularly, in at least one embodiment, based upon the contents of this request. In one embodiment, the request to activate the PTT service includes an indicator or an indication to the communication server to register the broadband device 120 with the second communication network. The indication can take any suitable form that is recognizable by the communication server. For example, the indication can be an identifier that is used by the mobile device 120 when operating in the second communication network (such as a P25 identifier (ID)). The identifier, in other implementations can be a SIP Uniform Resource Identifier (URI), or a SIP URI that contains the P25 ID associated or corresponding to the broadband device 120.

Thus, as part of the process of the communication server determining (208) whether to register the broadband device 120 to the second communication network, the communication server may execute a mapping function, wherein it evaluates the ID included in the request to activate the PTT service, determines a domain associated with or mapped to the ID, and determines based on this ID whether the broadband client 120 is authorized for PTT services on the second communication network. When the outcome of the mapping function yields a determination that the broadband device 120 is authorized for PTT services on the second communication network, the communication server generates (210) a request to register the broadband device 120 on the second communication network.

In another illustrative implementation, the indication is a flag in the request to activate the PTT service, such as a pre-allocated set of bits in the request that are used to signal to the communication server to register the broadband device 120 with the second communication network. In this embodiment, only the flag need be included in the request to activate the PTT service in order to trigger the communication server to make a determination to register the broadband device 120 with the second communication network. No additional device/user IDs (e.g., P25 IDs) for the second communication network are required to be added to the request to activate the PTT service when the flag is included in the request. In this implementation, the communication server uses a user profile database to make the determination to register the mobile device 120 to the second communication network. More particularly, the device/user IDs for the second communication network are pre-provisioned within the user profile database and, thereby, stored in the application network 106.

Upon determining (208) to register the broadband device 120 with the second communication network, the communication server generates (210) on behalf of the broadband device 120 a request to register the device 120 with the second communication network, which also defines and is, therefore, referred to herein as a "service registration message". It should be noted that, in this capacity, the communication server does not merely serve as a pass-through or gateway for a service registration message generated by the broadband device for the second communication network. The communication server actually generates (210) the service registration message for, or in other words on behalf of, the broadband device 120 and sends it to the second communication network.

Moreover, upon receiving a positive response to the service registration message, the broadband device 120 registers with the second communication network, and the communication server maintains alignment between the registrations or registration states of the broadband device 120 with the first and second communication networks. In one example implementation, upon receiving the registration response from the second communication network, the communication server generates an address binding between the SIP URI of the PTT client 122 and the narrowband (P25) ID included in the request to activate the PTT service on the first communication network. This can be done, for instance, by the communication server creating a state machine to maintain synchronization between the registration states in the two communication networks.

The service registration message can be any suitable message that is proprietary or compliant with a particular standard, such as a P25-compliant registration message, and is used to initiate a registration process with the second communication network. In one illustrative implementation, although the service registration message is generated by the communication server, it appears to the second communication network as if the broadband device 120 is a narrowband device sending the service registration message. A benefit, therefore, is that no modification to the infrastructure of the second communication network is necessary to implement the teachings of the present disclosure.

In yet another illustrative embodiment and responsive to receiving one or more requests to activate the PTT service in the first communication network, the communication server is triggered to generate (212) two (or more) service registration messages and send them to the second communication method. The first service registration message comprises (as discussed above) the request to register the broadband device 120 with the second communication network. The second (or additional) registration message(s), however, comprises a request to register a second (or more) additional mobile device(s) to the second communication network, wherein these additional mobile devices are first registered with an infrastructure device (e.g., a SIP/IP core) coupled to the first communication network.

In one embodiment, the one or more additional mobile devices are communicatively coupled to the broadband device 120, like the P25 device 126. In such an implementation scenario, one or more requests to activate the PTT service in the first communication network are received from the broadband device 120 and trigger the communication server to generate and send multiple service registration messages to register multiple mobile devices for PTT service on the second communication network.

In one example implementation, the broadband device 120 sends a single request to active the PTT service having multiple indications to the communication server to register the multiple mobile devices with the second communication network. For instance, the broadband device 120 sends a single service setting (e.g., an OMA PoC service setting) having multiple IDs for the second communication network (e.g., multiple P25 IDs) or multiple flags for multiple mobile devices. This can occur where, for instance, the mobile device coupled to the broadband device 120 includes a narrowband PTT application but not a broadband PTT client.

Thus, from the same request to activate the PTT service on the first communication device, the communication server not only determines to register the broadband device 120 but also determines to register at least a second mobile device (coupled to the broadband device) to the second communication network and then generates and sends a corresponding service registration message to the second communication network. Where multiple IDs are associated with the same service settings, the communication server maintains alignments between all of these registration states. In one particular P25/OMA PoC implementation, for instance, for each P25 ID transmitted within the OMA PoC service setting, the communication server generates and maintains a separate P25 registration state machine.

In another example implementation, the broadband device sends multiple requests to active the PTT service with each request having an indication to the communication server to register a different mobile device with the second communication network. For instance, the broadband device 120 sends two service settings (e.g., an OMA PoC service setting) each having a single ID (e.g., P25 ID) for the second communication network or a single flag for the corresponding device. In one embodiment, one service setting is generated by the broadband device 120 and another service setting is generated by the other mobile device coupled thereto. This can occur where, for instance, the mobile device coupled to the broadband device 120 also includes a broadband PTT client. Thus, in this case, from different requests to activate the PTT service on the first communication network, the communication server not only determines to register the broadband device 120 but also determines to register at least a second mobile device (coupled to the broadband device) to the second communication network and then generates and sends a corresponding service registration message to the second communication network.

Figure 3:
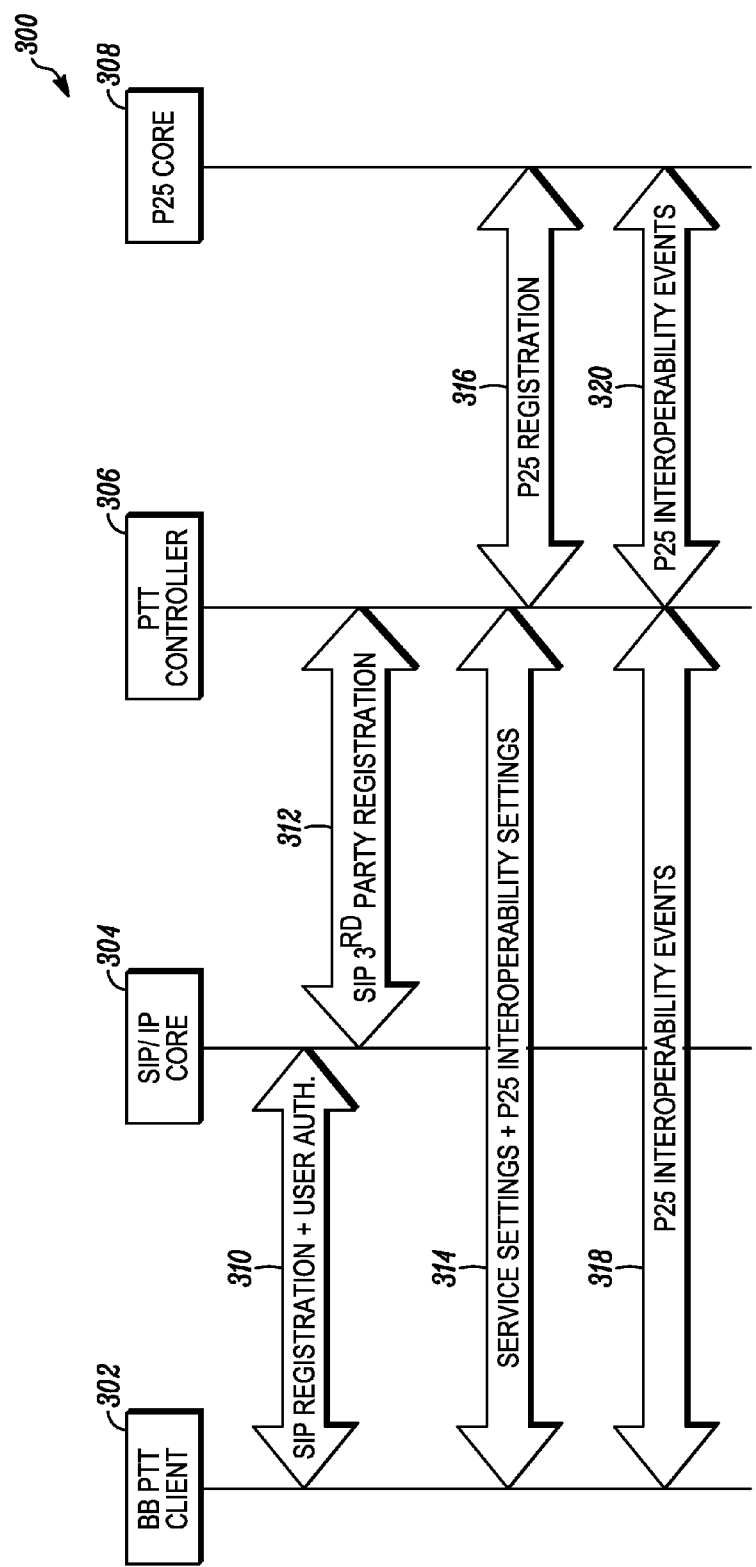
FIG. 3 illustrates a sequence diagram in accordance with at least one embodiment.

Turning now to FIG. 3, this figure illustrates a sequence diagram 300 particular to an illustrative P25/OMA PoC implementation, in accordance with various embodiments. As shown, a broadband PTT client 302 performs a SIP registration and user authentication process 310 with a SIP/IP core 304, wherein the process 310 is compliant with RFC 3261. In some embodiments, the SIP/IP core 304 performs a SIP third-party registration 312 on behalf of the broadband PTT client 302 to notify a PTT controller 306 (in this case an OMA PoC controller) that the broadband PTT client 302 is registered. However, there are other SIP procedures that can be used to notify the PTT controller 306 that the broadband PTT client 302 is registered including, but not limited to, a registration event notification or a presence subscription to name a few.

Upon successful SIP registration and user authentication 310, the broadband PTT client 302 communicates with the PTT controller 306. More particularly, the broadband PTT client 302 generates and transmits its OMA PoC service settings and P25 interoperability settings 314 to the PTT controller 306. The service settings are transmitted within a SIP PUBLISH message. As defined by the OMA PoC standards, providing the service settings to the PTT controller 306 provisions PTT service for the broadband PTT client 302. In another embodiment, the request to activate the PTT service (e.g., the service settings) is sent in at least one of, a different SIP message, a SIP Event notification, or a SIP Presence notification.

The PTT controller 306 evaluates the service settings received from the broadband PTT client 302. The PTT controller 306 then determines from the service settings whether to register the broadband PTT client 302 with a P25 core 308 infrastructure equipment in a P25 network. This determination can be made using any of the techniques earlier described by reference to method 200 above (illustrated in FIG. 2). In response to determining to register the broadband PTT client 302 to the P25 core 308, the PTT controller 306 generates a P25 registration message 316 that it sends to the P25 core 308. Illustratively, the P25 registration message 316 is associated with a narrowband P25 device within the P25 network. Transmission of the P25 registration message 316 and a subsequent unit registration response from the P25 core 308 serves to enable the registration of the broadband PTT client 302 in order for the associated mobile broadband device to interoperate with the P25 network's PTT services. Thus, the broadband PTT client 302 communicates with the P25 network as shown through P25 interoperability events 318 and 320 (e.g., transmission of PTT media and signaling), where the P25 interoperability events 318, 320 are mediated by the PTT controller 306.

FIG. 4 illustrates an example of XML computer-readable code 400 in accordance with some aspects of the present disclosure. In particular, the XML code 400 shows an example of a OMA PoC service setting message configured to support transmitting P25 IDs within the OMA PoC service setting message. In particular, the P25 IDs are embedded within a code segment 402 of the XML code 400. The embedded P25 IDs comprise a P25_wacn that has a twenty bit field, a P25_sys_id that has a twelve bit field, and a P25_unit_that has a 24 bit field. The numerical values provided in 402 are for illustrative purposes only.

The XML code, as described herein, is executed by one or more general-purpose computers. In some embodiments, the one or more general-purpose computers comprise portions of a server such as a OMA PoC server, a network such as an IP network and/or a P25 network, or one or more devices connected to such networks. Illustratively, the XML code is stored within XML documents in a database, for example, in an XML document management server (XDM) of the OMA PoC server. In other embodiments, the XML code is stored within alternate devices within the IP network and/or the P25 network, or within one or more devices connected to such networks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing service to a mobile device in a communication network, the method comprising:
    at a communication server:
    receiving, from a first mobile device registered with an infrastructure device coupled to a first communication network, a request to activate Push-to-Talk (PTT) service;
    activating the PTT service for the first mobile device in the first communication network;
    responsive to receiving the request to activate the PTT service, making a determination to register the first mobile device with a second communication network;
    generating a service registration message, on behalf of the first mobile device, to register the first mobile device with the second communication network; and
    transmitting the service registration message to the second communication network.

2. The method of claim 1 further comprising:
    responsive to receiving the request to activate the PTT service, making a determination to register a second mobile device with the second communication network, wherein the second mobile device is registered with the first communication network;
    generating a second service registration message, on behalf of the second mobile device, to register the second mobile device with the second network; and
    transmitting the second service registration message to the second network.

3. The method of claim 1 further comprising:
    receiving, from the first mobile device, a second request to activate the PTT service;
    responsive to receiving the second request to activate the PTT service, making a determination to register a second mobile device with the second communication network, wherein the second mobile device is registered with the first communication network;
    generating a second service registration message, on behalf of the second mobile device, to register the second mobile device with the second network; and
    transmitting the second service registration message to the second network.

4. The method of claim 1, wherein an indication contained in the request is used to make the determination to register the first mobile device with the second communication network.

5. The method of claim 4, wherein the indication comprises at least one of a Project 25 (P25) Identifier; a Session Initiation Protocol (SIP) Uniform Resource Identifier (URI); the SIP URI including the P25 Identifier; or a flag.

6. The method of claim 1, wherein a user profile database is used to make the determination to register the first mobile device with the second communication network.

7. The method of claim 1 further comprising maintaining alignment between registrations of the first mobile device with the first and second communication networks.

8. The method of claim 1, wherein the request to activate the PTT service comprises an Open Mobile Alliance (OMA) Push-to-Talk over Cellular (PoC) compliant service setting.

9. The method of claim 8, wherein the OMA PoC compliant service setting is included in a Session Initiation Protocol PUBLISH message received from the first mobile device.

10. The method of claim 1, wherein the request to activate the PTT service is included in at least one of: a Session Initiation Protocol (SIP) message, a SIP Event notification, or a SIP Presence notification received from the first mobile device.

11. A method for registering a mobile device to a communication network, the method comprising:
    at a first mobile device:
    registering with an infrastructure device coupled to a first communication network;
    sending, to a communication server, a request to activate Push-to-Talk (PTT) service in the first communication network, wherein the request to activate the PTT service triggers the communication server to generate, on behalf of the first mobile device and send to a second communication network, a request to register the first mobile device with the second communication network; and as a result of the request to register sent by the communication server, registering to the second communication network.

12. The method of claim 11, wherein the request to activate the PTT service further triggers the communication server to generate, on behalf of a second mobile device and send to the second communication network, a request to register the second mobile device with the second communication network.

13. The method of claim 11 further comprising sending, to the communication server, a second request to activate the PTT service in the first communication network, wherein the second request to activate the PTT service triggers the communication server to generate, on behalf of a second mobile device and send to the second communication network, a request to register the second mobile device with the second communication network.

14. The method of claim 11, wherein the request to activate the PTT service includes an indication that triggers the communication server to generate and send the request to register, wherein the indication comprises at least one of: a Project 25 (P25) Identifier; a Session Initiation Protocol (SIP) Uniform Resource Identifier (URI); the SIP URI including the P25 Identifier; or a flag.

15. The method of claim 11, wherein the request to activate the PTT service comprises an Open Mobile Alliance (OMA) Push-to-Talk over Cellular (PoC) compliant service setting.

16. The method of claim 11, wherein the request to activate the PTT service is included in at least one of: a Session Initiation Protocol (SIP) message, a SIP PUBLISH message, a SIP Event notification, or a SIP Presence notification sent from the first mobile device.

17. A system for registering a broadband client to a narrowband network comprising:

a communication server comprising a processing device, an interface, and a memory device operatively coupled and adapted to perform:

receiving, from a first mobile device registered with an infrastructure device coupled to a first communication network, a request to activate Push-to-Talk (PTT) service;

activating the PTT service for the first mobile device in the first communication network;

responsive to receiving the request to activate the PTT service, making a determination to register the first mobile device with a second communication network;

generating a service registration message, on behalf of the first mobile device, to register the first mobile device with the second communication network; and transmitting the service registration message to the second communication network.

18. The system of claim 17, wherein the first communication network is a broadband network, and the second communication network is a Project 25 network.

19. The system of claim 17, wherein the communication server comprises an Open Mobile Alliance (OMA) Push-to-Talk over Cellular (PoC) compliant Server.

* * * * *